Patented Mar. 1, 1927.

1,619,016

UNITED STATES PATENT OFFICE.

JACQUES DUCLAUX, OF PARIS, FRANCE.

CLARIFICATION OF BEVERAGES.

No Drawing. Application filed December 5, 1922, Serial No. 605,086, and in France December 6, 1921.

This invention relates to a process for the clarification of beverages and other liquids, whether fermented or otherwise.

In order to improve the appearance and ensure the preservation of beverages and other fermented liquids, wines, beers, ciders and the like, they are submitted to various treatments such as filtration, Pasteurization, sulphurization, fining and the like. These treatments have, however, noticeable drawbacks, from the point of view of taste, for instance, and, in many cases, they are insufficient or inefficient.

The present invention has for its object a new process which may replace these old treatments with advantage.

This process consists essentially in filtrating the fermented liquid to be treated through a membrane of the nature of cellulose, such as nitrocellulose, viscose, acetate of cellulose, denitrated nitro-cellulose, etc., and, more generally, through any membrane having the properties of an ultra-filter. This filtration through an ultra-filter ensures the complete clarification of the fermented liquid, while simultaneously producing an elimination of germs which is sufficiently thorough to ensure preservation, if not for an indefinite period, at least sufficient for all practical requirements.

It will be understood that the process may be industrially carried out by using filtrating apparatus permitting of a large output; it will also allow the clarification and the stabilization on a commercial scale of wines, beers, ciders and other fermented beverages or liquids. It is also understood that the process is applicable in similar conditions to non-fermented fruit juices.

Having now particularly described and ascertained the nature of my said invention and in what manner the same is to be performed, I declare that what I claim is:—

1. The method of clarifying and improving the keeping properties of fermented beverages containing material insoluble therein and living ferments, which comprises passing the same through an ultra filter having a membrane containing the cellulose radical.

2. The method of clarifying and improving the keeping properties of fermented beverages containing material insoluble therein and living ferments, which comprises passing the same through an ultra filter having a membrane containing nitro-cellulose.

In testimony that I claim the foregoing as my invention, I have signed my name.

JACQUES DUCLAUX.